(12) United States Patent  (10) Patent No.: US 8,295,066 B2
Lin  (45) Date of Patent: Oct. 23, 2012

(54) EXTENSIBLE SWITCHING POWER CIRCUIT

(75) Inventor: Ching-Chung Lin, Miao-Li County (TW)

(73) Assignee: Chimei InnoLux Corporation, Miaoli County (TW)

(*) Notice: Subject to any disclaimer, the term of this patent is extended or adjusted under 35 U.S.C. 154(b) by 358 days.

(21) Appl. No.: 12/763,149

(22) Filed: Apr. 19, 2010

(65) Prior Publication Data
US 2010/0296317 A1 Nov. 25, 2010

(51) Int. Cl.
*H02M 7/00* (2006.01)
(52) U.S. Cl. .......................................... 363/65; 363/71
(58) Field of Classification Search ............... 363/65–71
See application file for complete search history.

(56) References Cited

U.S. PATENT DOCUMENTS

| 7,830,686 | B2* | 11/2010 | Zeng et al. | 363/69 |
| 2005/0128775 | A1* | 6/2005 | Fukumoto | 363/65 |
| 2009/0116264 | A1 | 5/2009 | Lin | |
| 2009/0310390 | A1* | 12/2009 | Ohshima et al. | 363/71 |

FOREIGN PATENT DOCUMENTS

| CN | 2694605 Y | 4/2005 |
| CN | 101431300 A | 5/2009 |

* cited by examiner

*Primary Examiner* — Jessica Han
(74) *Attorney, Agent, or Firm* — Li & Cai Intellectual Property (USA) Office

(57) ABSTRACT

An extensible switching power circuit includes a plurality of switching power modules and a plurality of synchronous signal generators. Every two adjacent switching power modules are connected through a synchronous signal generator. The switching power modules generate induction electric potentials. Each synchronous pulse generator measures relevant electric potentials of the previous switching power module connected thereto and generates corresponding synchronous signals sent to the subsequent switching power module connected thereto. The subsequent switching power module regulates the phase of its induction electric potential according to the synchronous signals, such that the induction electric potentials of the two adjacent switching power modules compensate each other's energy gaps.

9 Claims, 12 Drawing Sheets

US 8,295,066 B2

1

EXTENSIBLE SWITCHING POWER CIRCUIT

BACKGROUND

1. Technical Field

The present disclosure relates to power circuits, and particularly to an extensible switching power circuit capable of providing corresponding matching currents according to different power loads.

2. Description of Related Art

Switching power circuits are widely used in electronic devices to convert alternating current (AC) provided by power supplies to direct current (DC) used by the electronic devices. Referring to FIG. 9, one such switching power circuit 40 generally includes a rectifier filter circuit 41, a transformer 42, a switch 43, a pulse width modulation (PWM) controller 44, a feedback circuit 45, a half-wave rectifier D1, and a capacitor Cout. The transformer 42 includes a primary winding L1 and a secondary winding L2. AC power supply (AC/IN) is connected to one end of the primary winding L1 through the rectifier filter circuit 41. Another end of the primary winding L1 is grounded through the switch 43 and a protective resistor (not labeled). One end of the secondary winding L2 is connected to one pole of the capacitor Cout through the half-wave rectifier D1, and another end of the secondary winding L2 and another pole of the capacitor Cout are both grounded. The output connector Vo of the switching power circuit 40 is connected between the half-wave rectifier D1 and the capacitor Cout. The PWM controller 44 is connected to the switch 43 to turn the switch 43 on and off. The feedback circuit 45 is connected between the PMU controller 43 and the output connector Vo.

When the switching power circuit 40 is used, AC provided by the AC power supply is converted to DC by the rectifier filter circuit 41, and input to the primary winding L1. Also referring to FIG. 10, the PWM controller 44 generates a controlling electric potential to periodically turn the switch 43 on, where the DC periodically passes through the primary winding L1, such that the DC is converted to a square wave DC. The square wave DC passing through the first winding L1 generates an alternating induction current in the secondary winding L2. The inducing current is filtered by the half-wave rectifier D1 and the capacitor Cout to be converted to DC, and then output from the output connector Vo for use. When the power load of the switching power circuit 40 changes, the PWM controller 44 can detect the change through the feedback circuit 45, and regulate the length of time the switch 43 is turned on and off according to the current load. Thus, the value of the induction current generated in the secondary winding L2 and the DC output from the output connector Vo can be correspondingly regulated. In this way, the switching power circuit 40 can provide corresponding DC according to different power loads.

In the switching power circuit 40, the capacitance of the capacitor Cout is generally configured to be greater than 100 pF for fully filtering out possible AC mixed in the output DC. However, when the induction current generated in the secondary winding L2 is filtered by the capacitor Cout, the charging/recharging process of the capacitor Cout may generate an obvious ripple current. Referring to FIG. 10, despite the electric potential provided by the rectifier filter circuit 41 ($V_1$) and the electric potential on the primary winding L1 ($V_{L1}$) being even square wave voltages, the electric potential of the output connector Vo ($V_{out}$) undulates due to the ripple current. When the length of time the switch 43 is turned on and off is regulated, the ripple current is correspondingly changed. By regulating the output DC according to different

2 power loads, the ripple current adversely influences the stability of the output current and electric potential, and may damage the switching power circuit 40.

Referring to FIG. 11, another conventional switching power circuit 50 includes a rectifier filter circuit 51, a PWM controller 52, four transformers TA, TB, TC, TD, four diodes TD1, TD2, TD3, TD4, four capacitors C1, C2, C3, C4, four switches Q1, Q2, Q3, Q4, and a feedback circuit 53. The transformers TA, TB, TC, TD respectively include primary windings L11, L21, L31, L41 and secondary windings L12, L22, L32, L42. Each of the primary windings L11, L21, L31, L41 has an end connected to the rectifier filter circuit 51. The other ends of the primary windings L11, L12, L13, L14 are respectively grounded through the switches Q1, Q2, Q3, Q4 and protective resistors (not labeled). Each of the secondary windings L12, L22, L32, L42 has an end grounded. The other ends of the secondary windings L12, L22, L32, L42 are respectively connected to the anodes of the diodes TD1, TD2, TD3, TD4. The cathodes of the diodes D1, D2, D3, D4 are all connected to the output connector Vo of the switching power circuit 50, and are also respectively grounded through the capacitors C1, C2, C3, C4. The PWM controller 52 is connected to the switches Q1, Q2, Q3, Q4 to control them periodically on/off. The feedback circuit 53 is connected between the PMU controller 52 and the output connector Vo.

When the switching power circuit 50 is used, AC provided by AC power supply is converted to DC by the rectifier filter circuit 51, and is input to the primary windings L11, L21, L31, L41. The PWM controller 52 generates different controlling electric potentials to respectively turn the switches Q1, Q2, Q3, Q4 on periodically, and the transformers TA, TB, TC, TD function similar to the aforementioned transformer 42. In the switching power circuit 50, the controlling electric potentials can be regulated to maintain the stability of the output current and electric potential. Also referring to FIG. 12, for example, the PWM controller 52 generates two square wave controlling electric potentials ($V_{G1}$, $V_{G2}$) to respectively periodically turn on the switches Q1, Q2. The phases of $V_{G1}$, $V_{G2}$ are partially staggered. Correspondingly, two square wave DC having staggered phases pass through the primary windings L11, L21, and induction electric potentials ($V_{L12}$, $V_{L22}$) having staggered phases are generated in the secondary windings L12, L22. In use, the DC passing through the primary windings L11, L21 may generate corresponding back electromotive forces (back EMF) in the secondary windings L12, L22. The directions of the back EMF are opposite to that of the induction electric potentials ($V_{L12}$, $V_{L22}$). When the back EMF and the induction electric potentials ($V_{L12}$, $V_{L22}$) are alternately generated in the secondary windings L12, L22, the back EMF may generate corresponding energy gaps ($V_{inv1}$, $V_{inv2}$) in the induction electric potentials ($V_{L12}$, $V_{L22}$). The energy gaps ($V_{inv1}$, $V_{inv2}$) may generate undulations in the output current and electric potential of the switching power circuit 50. However, the phases of the two induction electric potentials ($V_{L12}$, $V_{L22}$) are staggered, and thus $V_{L12}$ and $V_{L22}$ can compensate each other's energy gaps ($V_{inv1}$, $V_{inv2}$) when superimposed on the output connector Vo. Thus, the undulation of the electric potential on the output connector Vo ($V_{out}$) can be decreased, such that the switching power circuit 50 can provide an even DC. The feedback circuit 53 can be used similar to the feedback circuit 45 to detect the power load.

The switching power circuit 50 can provide an even DC, and the capacitances of the capacitors C1, C2, C3, C4 do not need to be greater than 100 pF. However, conventional PWM controllers, such as the PWM controller 52, can only turn at most four switches, such as the switches Q1, Q2, Q3, Q4, periodically on and off. Thus, the switching power circuit 50 can provide at most four output currents superimposed on the output connector Vo. The four currents may have difficulty to precisely compensating each other's gaps, and thus the undulations of the output electric potential of the switching power circuit 50 are difficult to fully remove.

Therefore, there is room for improvement within the art.

BRIEF DESCRIPTION OF THE DRAWINGS

Many aspects of the present extensible switching power circuit can be better understood with reference to the following drawings. The components in the various drawings are not necessarily drawn to scale, the emphasis instead being placed upon clearly illustrating the principles of the present extensible switching power circuit. Moreover, in the drawings, like reference numerals designate corresponding parts throughout the figures.

DETAILED DESCRIPTION

Figure 1:
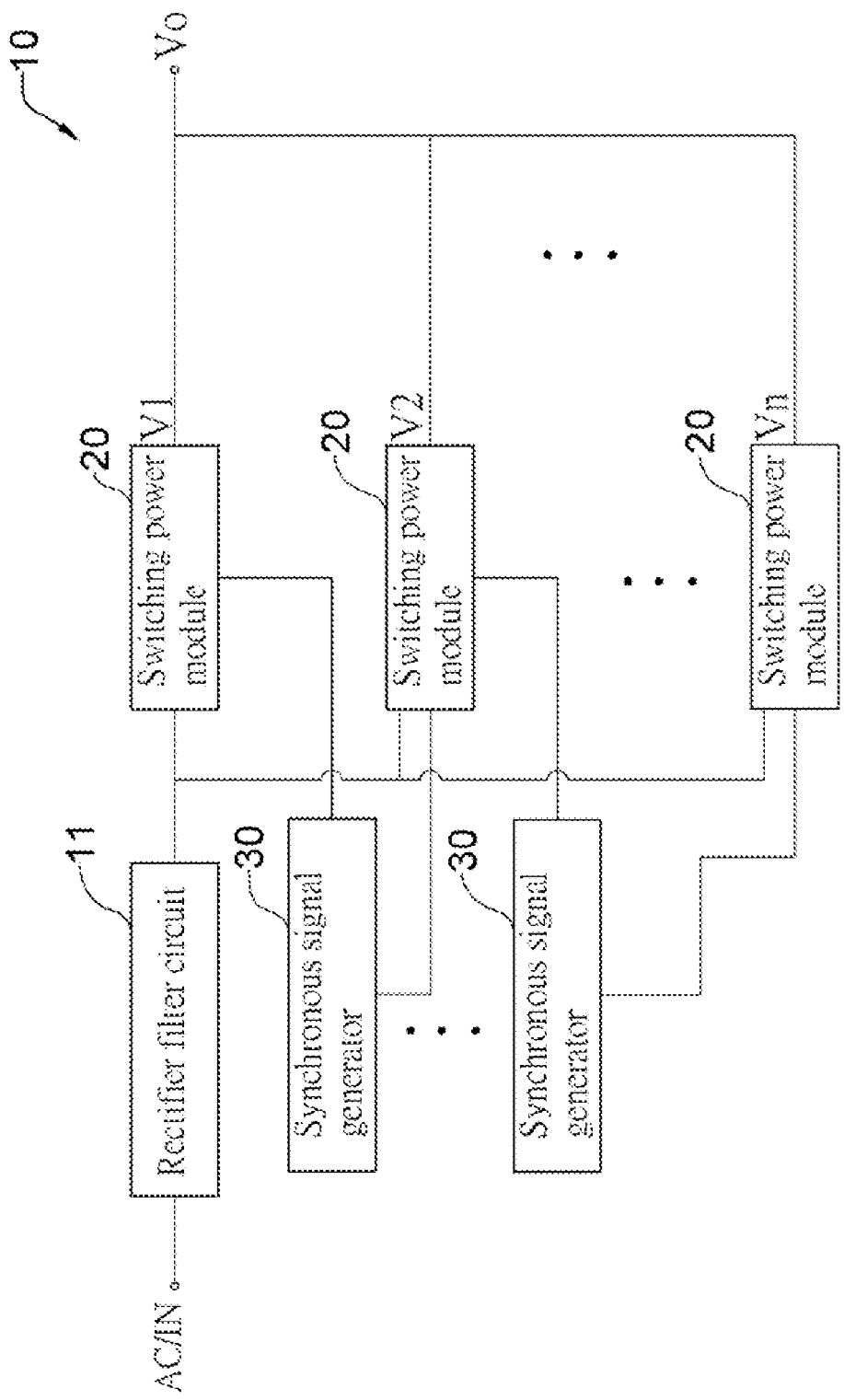
FIG. 1 is a block diagram of an extensible switching power circuit, according to a first exemplary embodiment.
Figure 2:
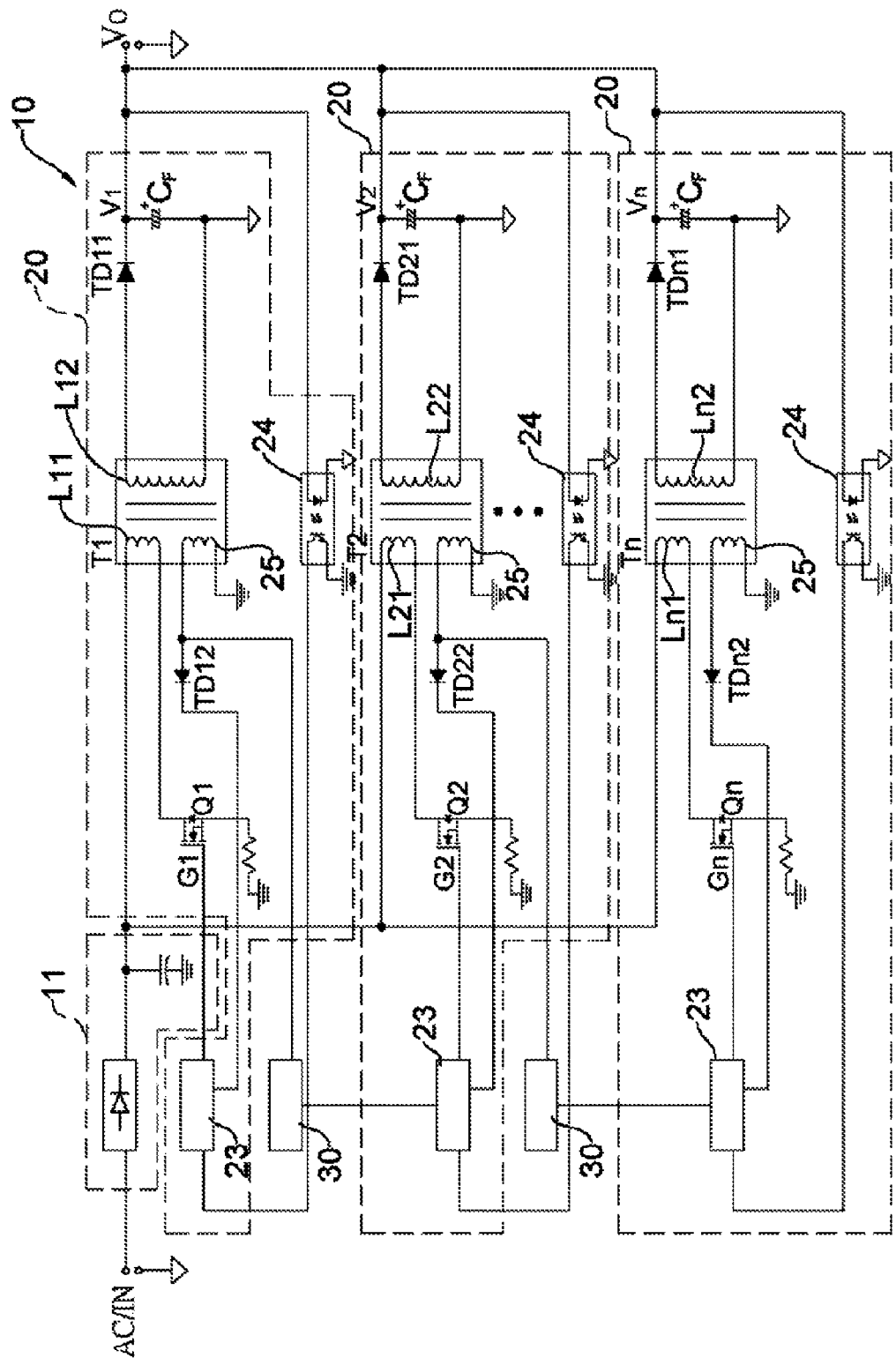
FIG. 2 is a circuit diagram of one embodiment of the extensible switching power circuit shown in FIG. 1.

FIG. 1 shows a block diagram of one embodiment of an extensible switching power circuit 10, according to a first exemplary embodiment. FIG. 2 shows a circuit diagram of one embodiment of the extensible switching power circuit 10 shown in FIG. 1.

The extensible switching power circuit 10 includes a rectifier filter circuit 11, a plurality of switching power module 20, and a plurality of synchronous signal generators 30. The rectifier filter circuit 11 is connected to an AC power supply (AC/IN). The plurality of switching power modules 20 are connected in parallel to the rectifier filter circuit 11. The input connectors (not labeled) of the switching power modules 20 are all connected to the rectifier filter circuit 11, and the output connectors (V1, V2, . . . Vn) are all connected to the output connector Vo of the extensible switching power circuit 10. The number of synchronous signal generators 30 is one less than the number of switching power modules 20. Each synchronous signal generator 30 is connected between two adjacent switching power modules 20, such that any two adjacent switching power modules 20 are connected through a synchronous signal generator 30.

Each switching power module 20 is a flyback switching power module, including a transformer T1 (or T2-Tn), two diode TD11 (or TD21-TDn1), TD12 (or TD22-TDn2), a capacitor $C_F$, a switch Q1 (or Q2-Qn), a PWM controller 23, a feedback circuit 24, and a circuit transformer 25. The transformer T1 includes a primary winding L11 (or L21-Ln1) and a secondary winding L12 (or L22-Ln2). The primary winding L11 (or L21-Ln1) has one end connected to the rectifier filter circuit 11 and another end grounded through the switch Q1 (or Q2-Qn) and at least one protective resistor (not labeled). One end of the secondary winding L12 (or L22-Ln2) is connected to one pole of the capacitor $C_F$ through the diode TD1, and another end of the secondary winding L2 and another pole of the capacitor $C_F$ are both grounded. The output connector Vo of the extensible switching power circuit 10 is connected between the diode TD1 and the capacitor $C_F$. The PWM controller 23 is connected to the switch Q1 (or Q2-Qn) to turn the switch Q1 (or Q2-Qn) on and off. The feedback circuit 24 is connected between the PMU controller 23 and the output connector Vo, such that the PMU controller 23 can detect the power load of the switching power module 20 through the feedback circuit 24. The current transformer 25 is integrated within the transformer T1 (or T2-Tn), and is coaxial with the primary winding L11 (or L21-Ln1). The current transformer 25 is connected to the PWM controller 23 through the diode TD12 (or TD22-TDn2), such that the PWM controller 23 can detect the electric potential of the primary winding T1. As well as the current transformer 25 of the last switching power module 20, the current transformer 25 integrated with the transformer Tn, each current transformer 25 is also connected to the PWM controller 23 of a subsequent switching power module 20 through the synchronous signal generator 30 connected between the two switching power modules 20.

Figure 3:
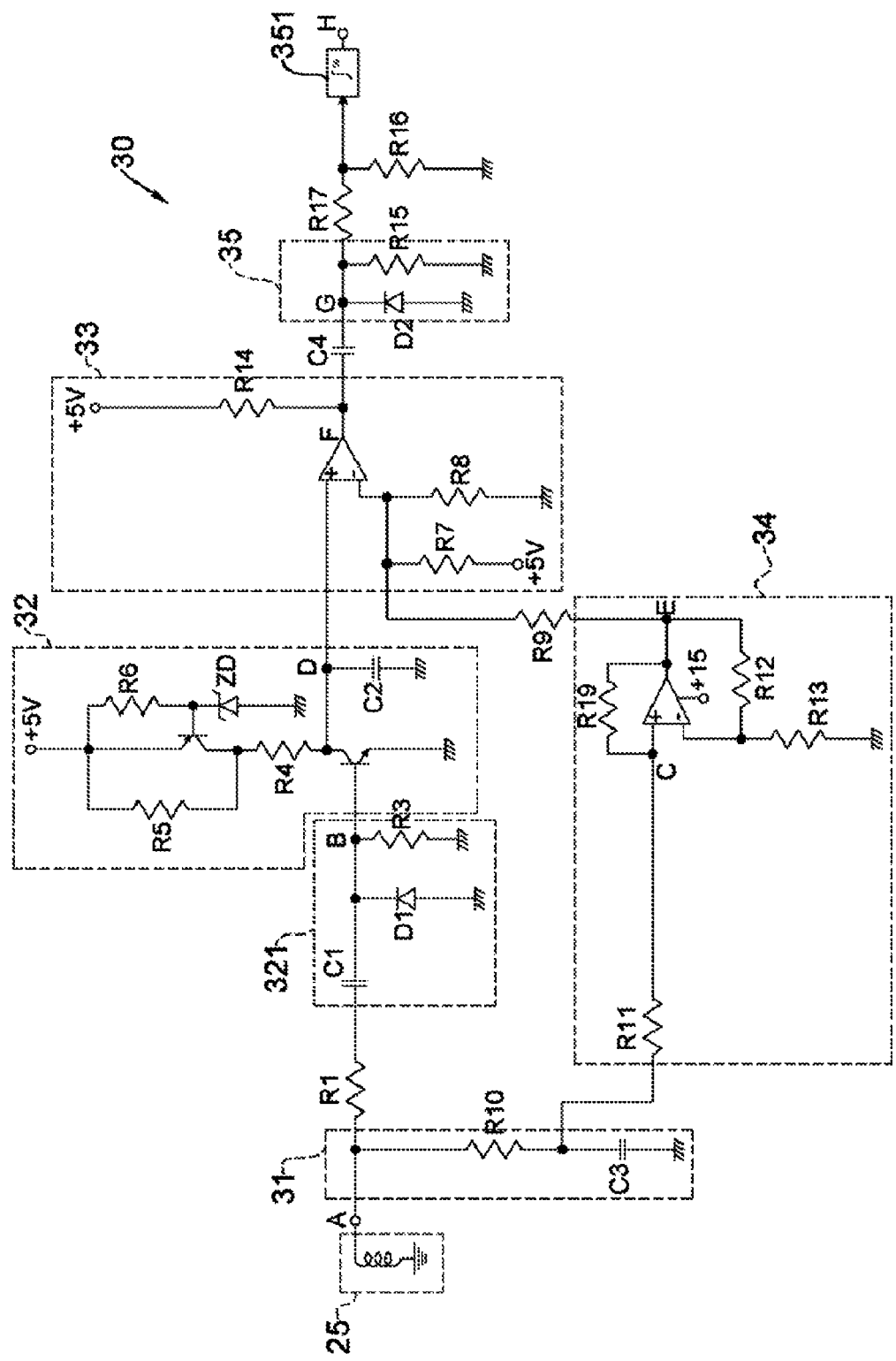
FIG. 3 is a circuit diagram of a synchronous signal generator of one embodiment of the extensible switching power circuit shown in FIG. 1.
Figure 4:
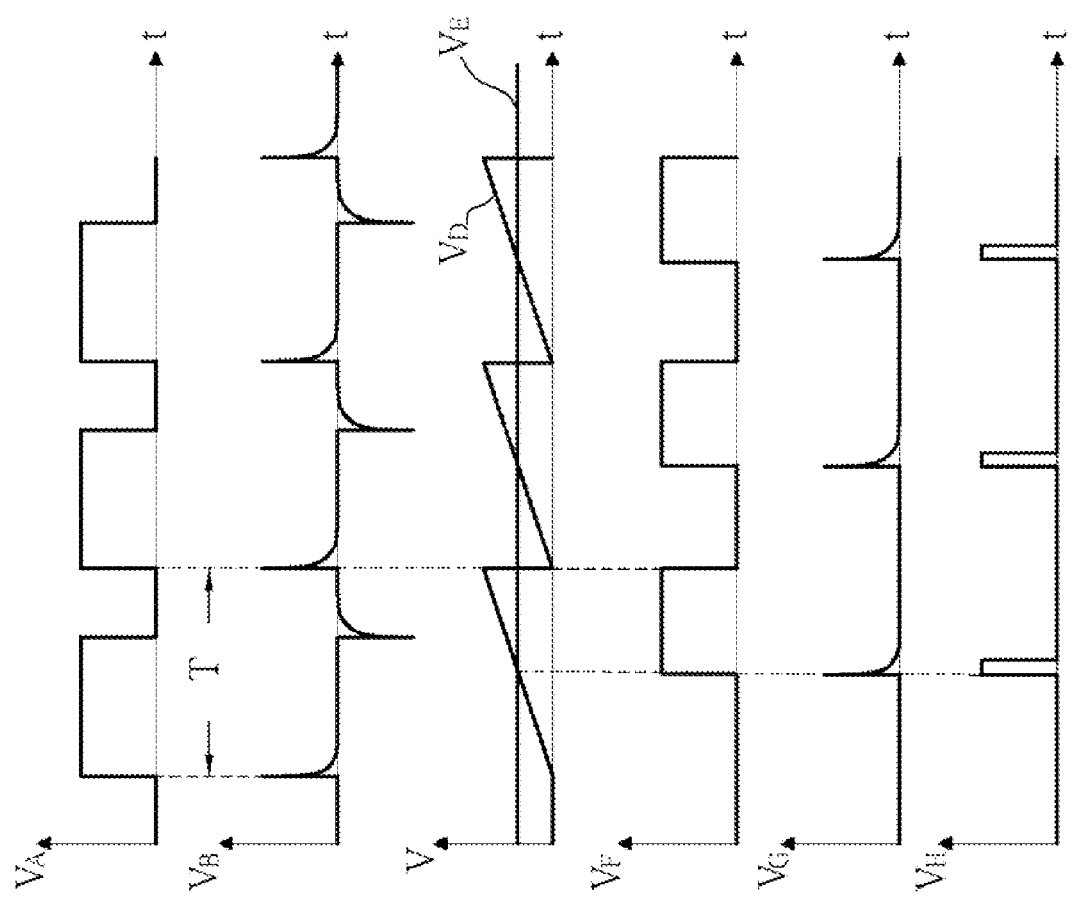
FIG. 4 is a schematic view of working signal wave curves of the synchronous signal generator of one embodiment of the extensible switching power circuit shown in FIG. 1.

Also referring to FIG. 3 and FIG. 4, each synchronous signal generator 30, such as that of the first switching power circuit 20, includes a phase delay correction circuit 31, a phase measuring circuit 321, a phase adjusting unit 32, a phase adjusting pulse generator unit 33, a phase correction controller unit 34, a synchronous signal sampling unit 35, and a synchronous signal rectifier 351. The phase delay correction circuit 31 is an RC integral circuit connected to a current transformer 25 of a switching power module 20. The phase delay correction circuit 31 can detect the electric potential $V_A$ of the primary winding L11 through the current transformer 25, and integrate $V_A$ to generate DC electric potential $V_E$. The phase correction controller unit 34 is connected to the phase delay correction circuit 31. The phase measuring circuit 321 is also connected to the current transformer 25 to detect $V_A$. The phase adjusting unit 32 can be an RC integral circuit, a delay ripple counter, or a sawtooth wave generator, for example. The phase adjusting unit 32 is connected to the phase measuring circuit 321 to receive $V_A$. The phase adjusting unit 32 can detect the edge signals $V_B$ of $V_A$ and generate a phase adjusting signal $V_D$ according to $V_B$. The signal $V_D$ can be sawtooth waves generated during the periods between any two adjacent rising edges of $V_A$. The voltage of $V_D$ gradually increases during each period between any two adjacent rising edges of $V_A$, and the voltage of $V_D$ corresponding to each falling edge of $V_A$ is regulated to be higher than the voltage of $V_E$.

The phase adjusting pulse generator unit 33 is an operational amplifier circuit. The phase adjusting unit 32 is connected to the positive input connector of the phase adjusting pulse generator unit 33, and the phase correction controller unit 34 is connected to the negative input connector of the phase adjusting pulse generator unit 33. The output connector of the phase adjusting pulse generator unit 33 is connected to the synchronous signal rectifier 351 through the synchronous signal sampling unit 35. The synchronous signal rectifier 351 is connected to the PWM controller 23 of a subsequent switching power module 20, such as the second switching power circuit 20. In use, $V_E$ and $V_D$ are both input to the phase adjusting pulse generator unit 33. The phase adjusting pulse generator unit 33 compares the phases of $V_D$ and $V_E$ and generates a comparison signal $V_F$ according to the result. The comparison signal $V_F$ is a square wave voltage, and the square waves of $V_F$ are generated when the voltage of $V_D$ exceeds the voltage of $Y_E$. The synchronous signal sampling unit 35 samples the rising edge signal $V_G$ of $Y_F$. The synchronous signal rectifier 351 rectifies $V_G$ to a synchronous pulse signal $V_H$ and transmits $V_H$ to the PWM controller 23 of the subsequent switching power module 20.

According to the method closed, $V_D$ is generated according to the edge signal $V_B$ of $V_A$, and then has periods and phases that are substantially same as $V_A$. Since the voltage of $V_D$ that corresponds to each falling edge of $V_A$ is higher than the voltage of $V_E$, the rising edges of $V_F$, which correspond to times when the voltage of $V_D$ equals the voltage of $Y_E$, are generated between the rising and falling edges of each square wave of $V_A$. Therefore, $V_G$ and $V_H$ corresponding to the rising edges of $V_F$ are also generated between the falling and rising edges of each square wave of $V_A$. The voltage peak value of $V_D$ can be regulated, such that when the voltage of $V_D$ equals the voltage of $V_E$, the period of $V_F$, and the generating times of $V_G$ and $V_H$ can be correspondingly regulated. Thus, the pulses of $V_H$ can be generated any time between the falling and rising edges of each square wave of $V_A$.

Figure 5:
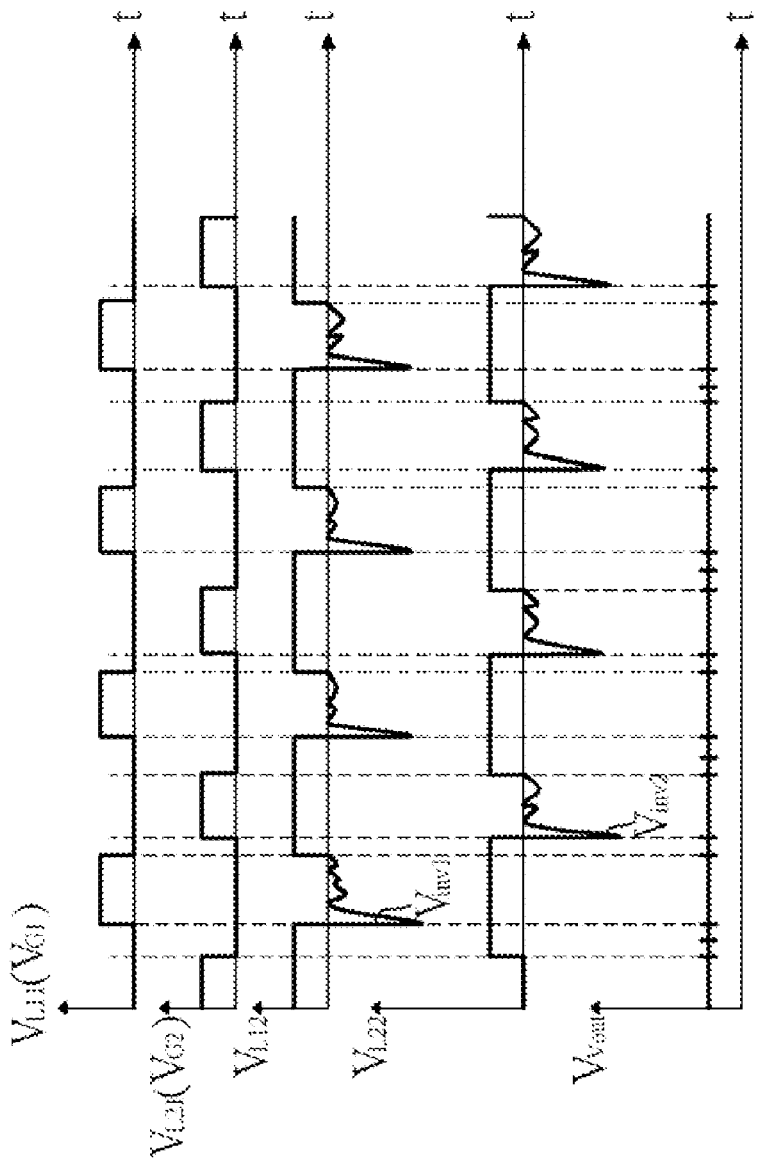
FIG. 5 is a schematic view of working signal wave curves of one embodiment of the extensible switching power circuit shown in FIG. 1.

Also referring to FIG. 5, when two adjacent switching power modules 20, such as the first and second switching power modules 20, are used, AC provided by the AC power supply is converted to DC by the rectifier filter circuit 11, and is input to the primary windings L11, L21. The PWM controllers 23 of the two switching power modules 20 respectively generate controlling electric potentials to turn the switches Q1, Q2 periodically on, such that a square wave DC passes through the primary windings L11, L21. The electric potential of the primary winding L11 of the first switching power module 20 ($V_{L11}$) and the controlling electric potential of the switch Q1 of the first switching power module 20 ($V_{G1}$) are both square wave voltages. $V_{L11}$ is equivalent to the aforementioned $V_A$, and $V_{G1}$ has same phases as $V_{L11}$. The electric potentials $V_{L11}/V_{G1}$ generate an induction electric potential ($V_{L12}$) in the secondary winding L12 of the first switching power module 20 for output to the output connector Vo of the extensible switching power circuit 10. In use, the DC passing through the primary winding L11 may generate corresponding back electromotive forces (back EMF) in the secondary windings L12. The directions of the back EMF are opposite to that of the induction electric potential ($V_{L12}$). When the back EMF and the induction electric potential ($V_{L12}$) are alternately generated in the secondary windings L12, the back EMF may generate corresponding energy gaps ($V_{inv1}$) in the induction electric potential ($V_{L12}$). The energy gaps ($V_{inv1}$) may generate undulations in the output current and electric potential of the switching power circuit 10. However, the synchronous signal generator 30 connected to the current transformer 25 of the first switching power module 20 measures $V_{L11}/V_{G1}$, and generates a synchronous pulse signal $V_H$ according to $V_{L11}/V_{G1}$.

The PWM controller 23 of the second switching power module 20 receives $V_H$ from the synchronous signal generator 30 and measures the period and phase of $V_{L11}/V_{G1}$ according to $V_H$.

Similar to the PWM controller 23 of the first switching power module 20, the PWM controller 23 of the second switching power module 20 generates a square wave voltage ($V_{G2}$) as the controlling electric potential to turn the switch Q2 periodically on and off, thereby generating an induction electric potential ($V_{L22}$) in the secondary winding L22. Similar to the first switching power module 20, energy gaps ($V_{inv2}$) are also generated in the induction electric potential ($V_{L22}$) due to the back EMF generated by the DC passing through the primary winding L21. Upon measuring $V_{L11}/V_{G1}$ according to $V_H$, the PWM controller 23 of the second switching power module 20 can regulate the phases of $V_{G2}$ and the electric potential of the primary winding L21 ($V_{L21}$) to be staggered with those of $V_{L11}/V_{G1}$. Correspondingly, the induction electric potentials ($V_{L12}$, $V_{L22}$) of the secondary windings L12, L22 can also be regulated to staggered phases, and compensate each other's energy gaps ($V_{inv1}$, $V_{inv2}$) when superimposed on the output connector Vo.

When the extensible switching power circuit 10 is used, similar to the above-detailed method, each synchronous pulse generator 30 measures the induction electric potential of the previous switching power module 20 connected thereto and generates a corresponding synchronous signal $V_H$. The PWM controller 23 of the subsequent switching power module 20 connected to the synchronous pulse generator 30 receives $V_H$ and regulates the phase of the controlling electric potential on the switch (Q2-Qn) of the subsequent switching power module 20 according to $V_H$. Thus, the phase of the induction electric potential of the subsequent switching power module 20 is correspondingly regulated, such that the phases of the induction electric potentials respectively generated by the two switching power modules 20 both connected to the synchronous pulse generator 30 are staggered. Thus, the induction electric potentials of the two switching power modules 20 can compensate each other's energy gaps when superimposed on the output connector Vo. According to the above-detailed connecting method, the extensible switching power circuit 10 can be extended to have more switching power modules. The number of the switching power modules 20 is not limited, and thus the output electric potentials of the switching power modules 20 can better compensate each other's energy gaps. Thus, the undulation of the electric potential on the output connector Vo ($V_{out}$) can be fully decreased, and the extensible switching power circuit 10 can provide even DC.

Figure 6:
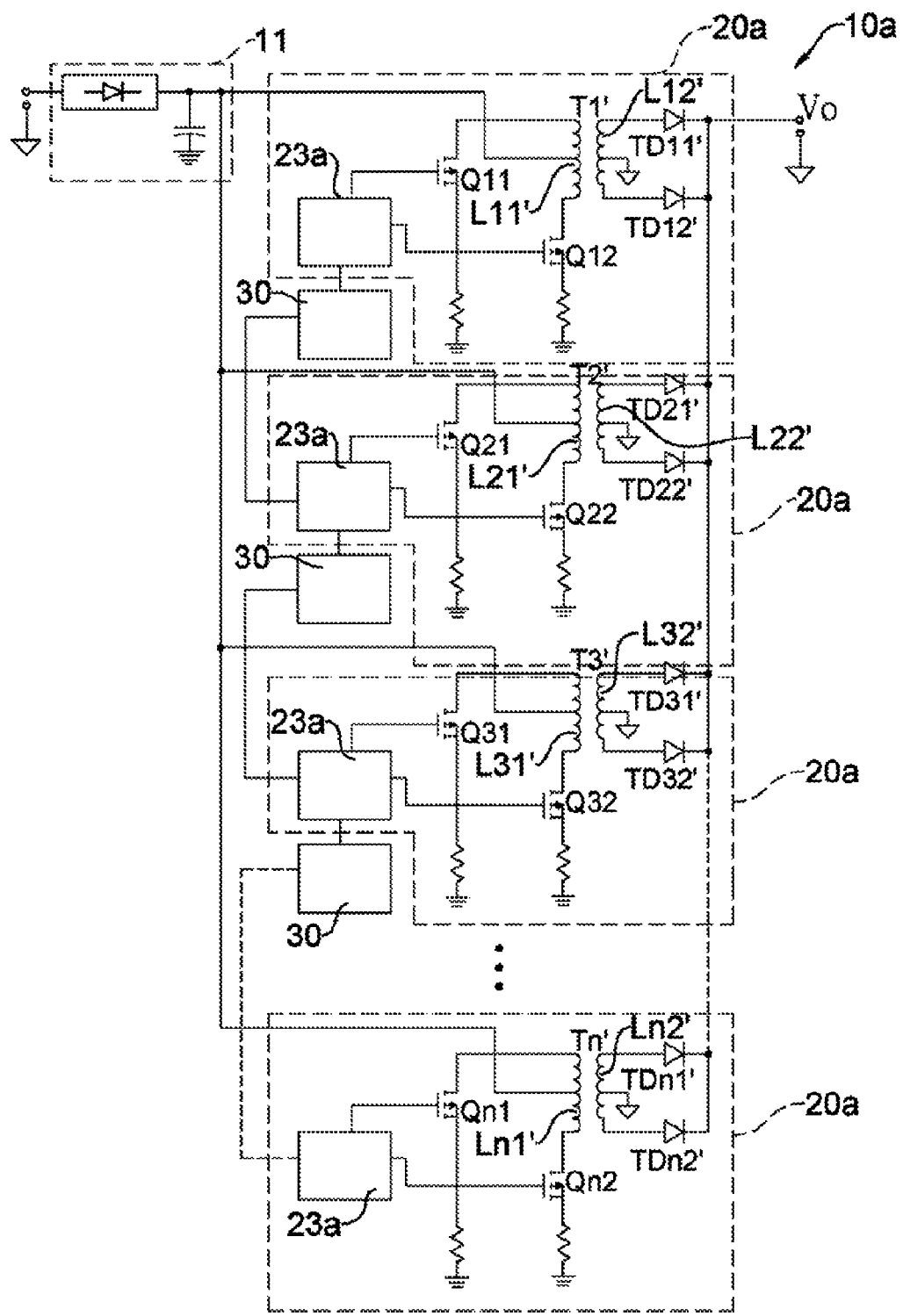
FIG. 6 is a circuit diagram of an extensible switching power circuit, according to a second embodiment.

Also referring to FIG. 6, an extensible switching power circuit 10a, according to a second embodiment, is provided, differing from the disclosed extensible switching power circuit 10 only in the replacement of each switching power module 20 of the extensible switching power circuit 10 with a switching power module 20a, a push-pull switching power module. The switching power module 20a includes a central-tapped transformer T1' (or T2'-Tn'), two diodes TD11', TD12' (or TD21'-TDn1', TD22'-TDn2'), two switches Q11, Q12 (or Q21-Qn1, Q22-Qn2), and a PWM controller 23a. The central-tapped transformer T1' (or T2'-Tn') includes a central-tapped primary winding L11' (or L21'-Ln1') and a central-tapped secondary winding L12' (or L22'-Ln2'). Two ends of the primary winding L11' (or L21'-Ln1') are respectively grounded through the switches Q11 (or Q21-Qn1) and Q12 (or Q22-Qn2) and protective resistors (not labeled). The central tap of the primary winding L11' (or L21'-Ln1') is connected to the rectifier filter circuit 11. The PWM controller 23 is connected to the switches Q11 (or Q21-Qn1) and Q12 (or Q22-Qn2) to turn the switches Q11 (or Q21-Qn1 and Q12 (or Q22-Qn2) periodically on and off, and is also connected to the PMW controller 23 of the subsequent switching power module 20a through a synchronous signal generator 30. The two ends of the secondary winding L12' (or L22'-Ln2') are respectively connected to the output connector Vo of the extensible switching power circuit 10a through the diodes TD11', TD12' (or TD21'-TDn1', TD22'-TDn2'), and the central tap of the secondary winding L12' (or L22'-Ln2') is grounded.

When each switching power circuit 10a, such as the first switching power module 10a, is used, AC provided by the AC power supply is converted to DC by the rectifier filter circuit 11, and is input to the primary windings L11 through the central taps thereof. The PWM controllers 23 generate controlling electric potentials to respectively turn the switches Q11, Q12 periodically on, such that a square wave DC passes through the primary winding L11'. Correspondingly, induction electric potentials are generated in the secondary winding L21' and transmitted to the output connector Vo through the two ends of the secondary winding L12/and the diodes TD11', TD12'. At the same time, the synchronous signal generator 30 connected to the PWM controller 23a of the first switching power module 20a measures the periods and phases of the controlling electric potentials on the switched Q11, Q12, and generates a corresponding synchronous pulse signal (equivalent to $V_H$). The signal is sent to the PWM controller 23a of the subsequent switching power module 20a, such as the second switching power module 10a. When the second switching power module 10a is used, the PWM controller 23a thereof can regulate the phases of the controlling electric potentials on the switches Q21, Q22 according to the detection data. Correspondingly, the induction electric potentials of the first and second switching power modules 10a can be regulated to staggered phases, such that they can compensate each other's energy gaps when superimposed on the output connector Vo. Similar to the extensible switching power circuit 10, in the extensible switching power circuit 10a, the number of switching power modules 20a is not limited, and thus the output electric potentials of the switching power modules 20a can better compensate each other's energy gaps.

Figure 7:
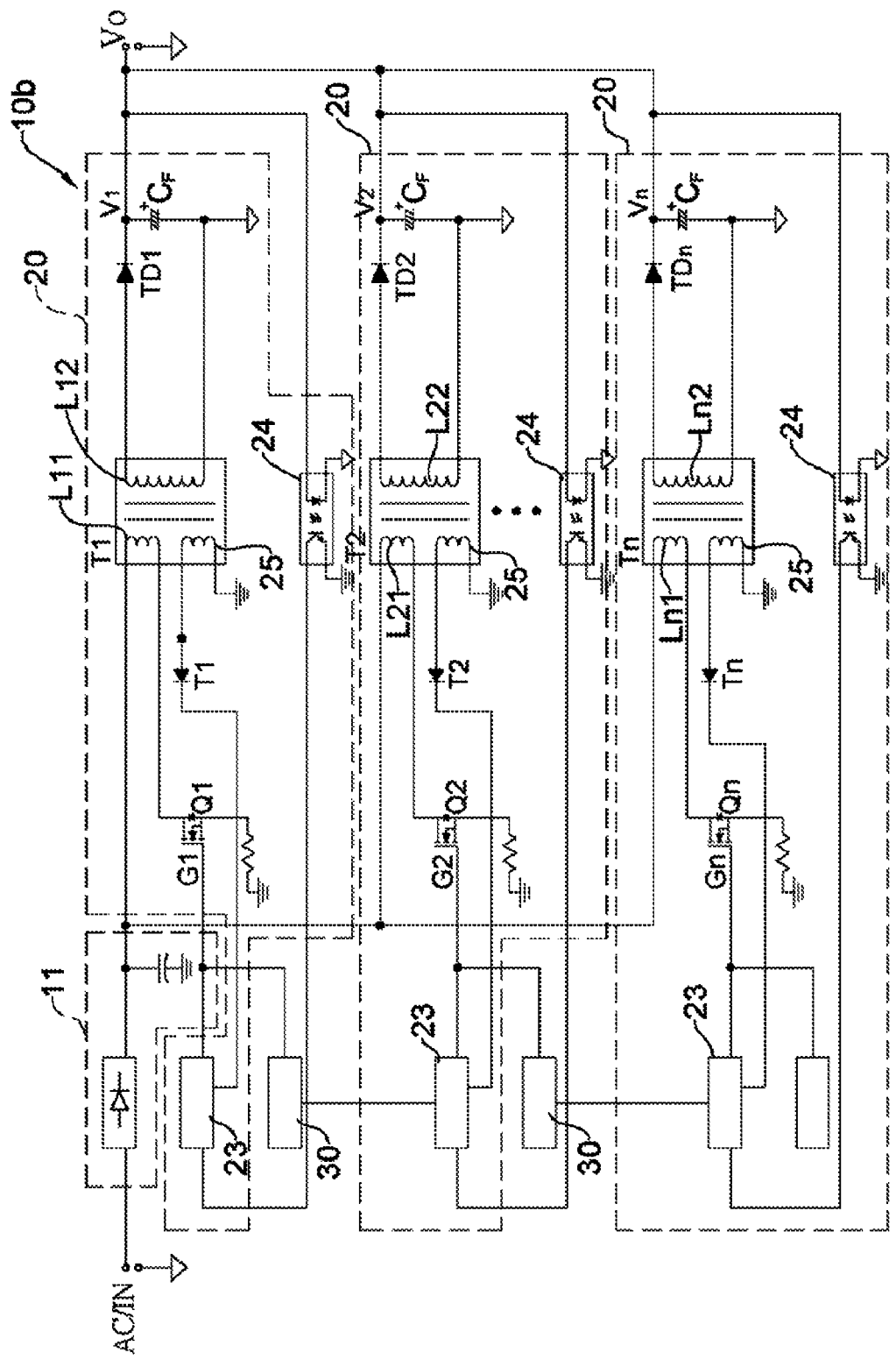
FIG. 7 is a circuit diagram of an extensible switching power circuit, according to a third embodiment.

Also referring to FIG. 7, an extensible switching power circuit 10b, according to a third embodiment, is provided, differing from the extensible switching power circuit 10, only in that each synchronous signal generator 30 has one end connected to a controlling end, that is, the end receiving the controlling electric potential, of a switch Q1 (or Q2-Qn) of a previous switching power module 20 and another end connected to the PWM controller 23 of a subsequent switching power module 20. The PWM controller 23 of each subsequent switching power module 20 can measure the controlling electric potential of the switch Q1 (or Q2-Qn) of its previous switching power module 20 through the synchronous signal generator 30, and further measure the electric potential of the primary windings L11 (or L21-Ln1) and the induction electric potentials . Accordingly, the PWM controller 23 of the subsequent switching power module 20 can regulate the phase of the controlling electric potential on the switch (Q2-Qn), such that the induction electric potentials of the two switching power modules 20 both connected to the synchronous pulse generator 30 are correspondingly regulated to staggered phases and can compensate each other's energy gaps.

Figure 8:
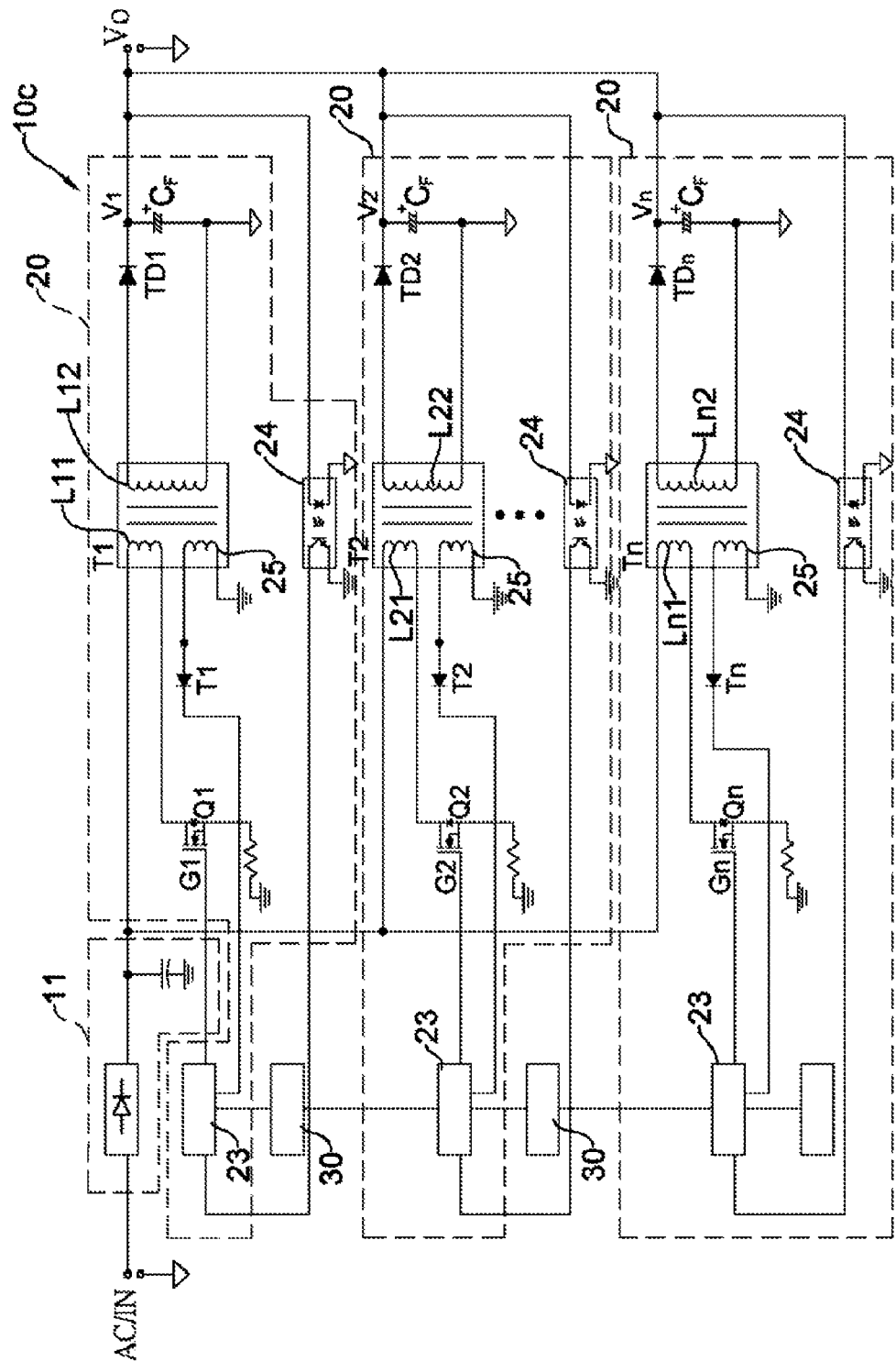
FIG. 8 is a circuit diagram of an extensible switching power circuit, according to a fourth embodiment.
Figure 9:
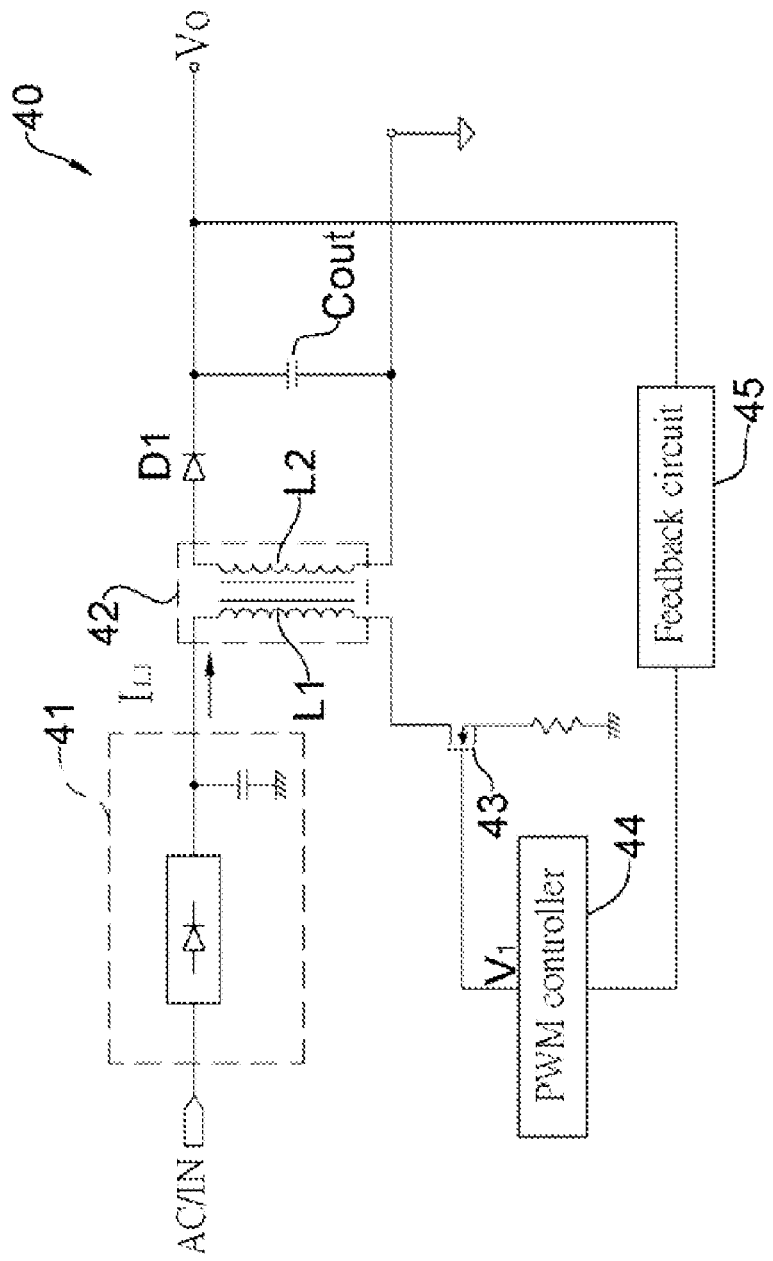
FIG. 9 is a circuit diagram of one embodiment of a conventional switching power circuit.
Figure 10:
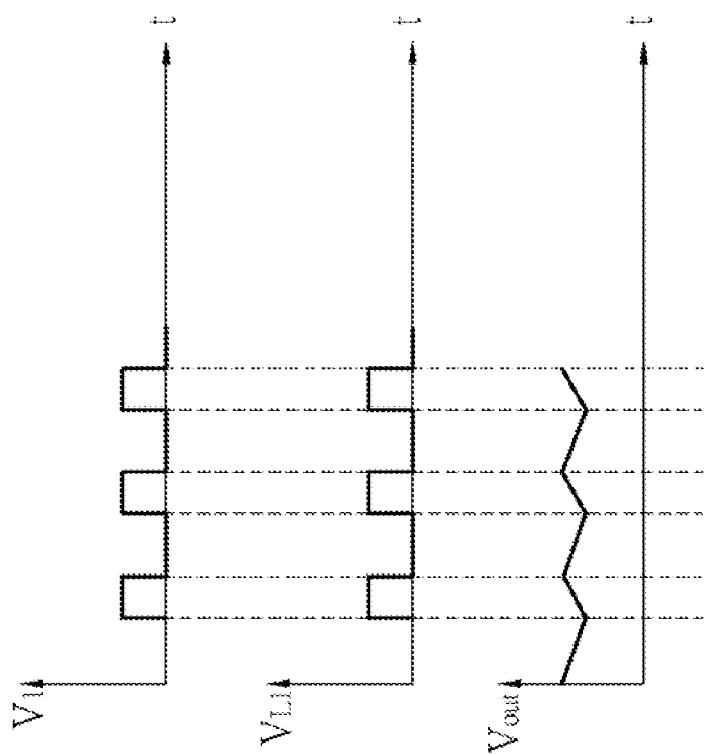
FIG. 10 is a schematic view of working signal wave curves of one embodiment of the conventional switching power circuit shown in FIG. 9.
Figure 11:
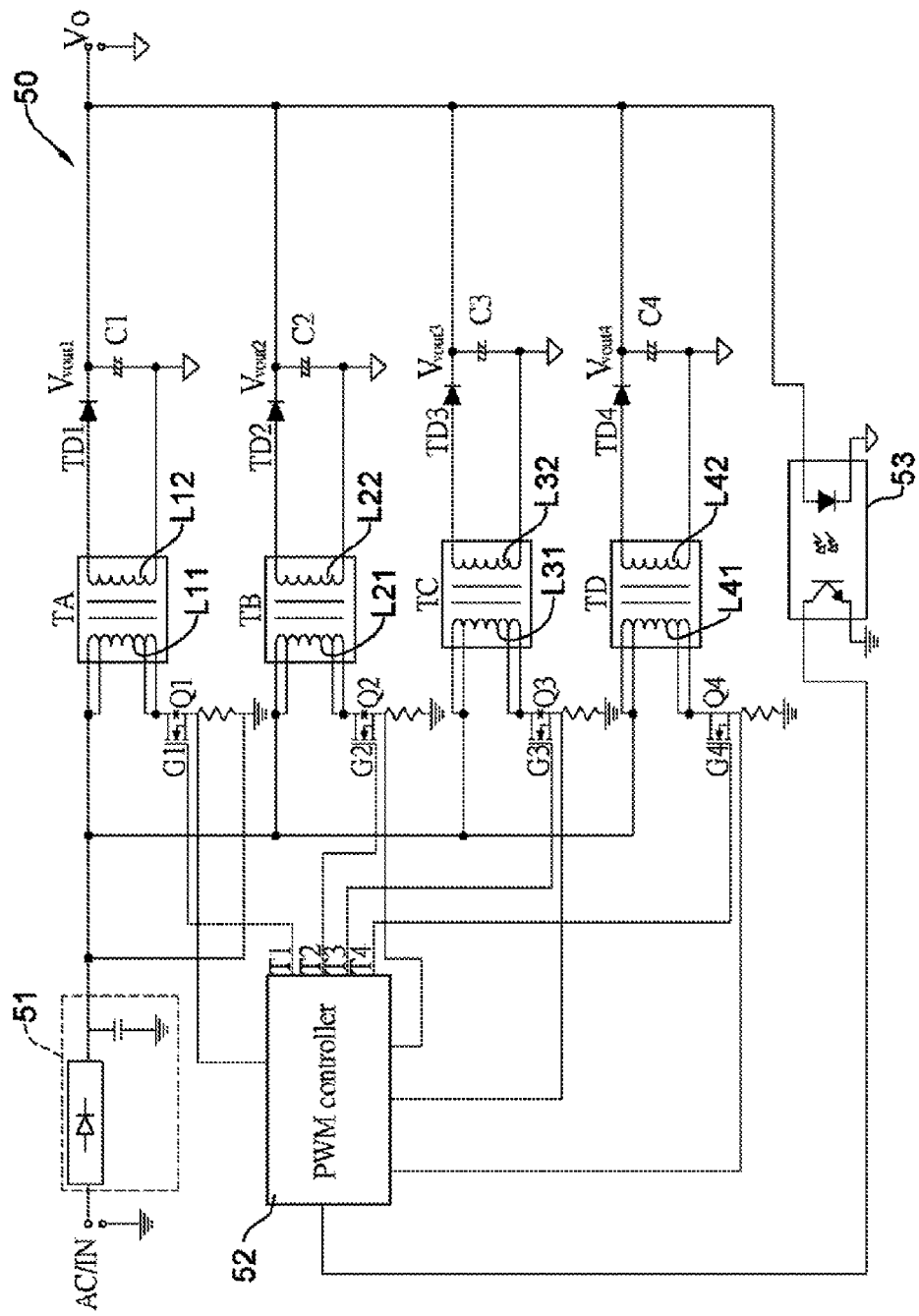
FIG. 11 is a circuit diagram of another embodiment of a conventional switching power circuit.
Figure 12:
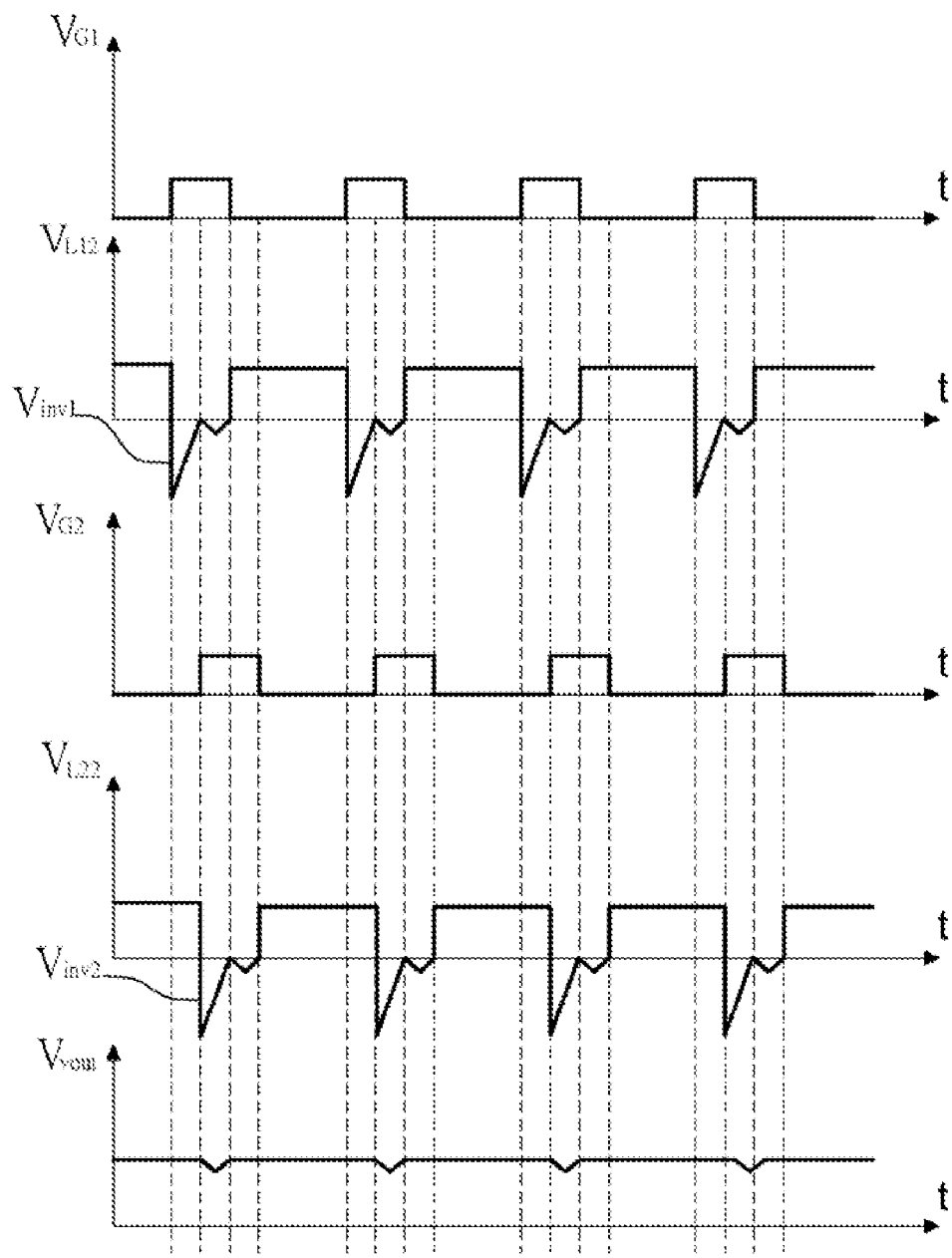
FIG. 12 is a schematic view of working signal wave curves of one embodiment of the conventional switching power circuit shown in FIG. 11.

Also referring to FIG. 8, an extensible switching power circuit 10c, according to a fourth embodiment, is provided, differing from the extensible switching power circuit 10, in that each synchronous signal generator 30 has one end directly connected to the PWM controller 23 of a previous switching power module 20 and another end connected to the PWM controller 23 of a subsequent switching power module 20. The PWM controller 23 of each subsequent switching power module 20 can measure the controlling electric potential of the switch Q1 (or Q2-Qn) of its previous switching power module 20 through the synchronous signal generator 30 and the PWM controller 23 of the previous switching power module 20, and further measure the electric potential of the primary windings L11 (or L21-Ln1). Accordingly, the PWM controller 23 of the subsequent switching power module 20 can regulate the phase of the controlling electric potential on the switch (Q2-Qn), such that the induction electric potentials of the two switching power modules 20 both connected to the synchronous pulse generator 30 are correspondingly regulated to staggered phases and can compensate each other's energy gaps.

The switching power modules 20, 20a can alternatively be half-bridge switching power modules, or full-bridge switching power modules, for example.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An extensible switching power circuit, comprising:
a rectifier filter circuit;
a plurality of switching power modules connected in parallel to the rectifier circuit, each switching power module including a transformer and a pulse width modulation (PWM) controller connected to the transformer; and
a plurality of synchronous signal generators, with every two adjacent switching power modules connected through one of the plurality of synchronous signal generators;
wherein the rectifier filter circuit converts an alternating current (AC) to a direct current (DC) and inputs the DC to the transformers, and the PWM controllers control the DC provided by the rectifier filter circuit to generate induction electric potentials in the transformers; each synchronous pulse generator measures relevant electric potentials of the previous switching power module connected thereto and generates corresponding synchronous signals sent to the PWM controller of the subsequent switching power module connected thereto; and the PWM controller of the subsequent switching power module regulates the phase of the induction electric potential of the subsequent switching power module according to the synchronous signals, such that the induction electric potentials of the two adjacent switching power modules compensate each other's energy gaps generated by back electromotive forces generated in the transformers of the two adjacent switching power modules by the DC input to the transformers.

2. The extensible switching power circuit as claimed in claim 1, wherein each switching power module further includes a switch and each transformer includes a primary winding and a secondary winding, the primary winding comprising one end connected to the rectifier filter circuit and another end grounded through the switch, the PWM controller of the switching power module is connected to the switch;

and the PWM controller generates a controlling electric potential to turn the switch periodically on, such that the DC provided by the rectifier filter circuit periodically passes through the primary winding and generates an induction electric potential in the secondary winding.

3. The extensible switching power circuit as claimed in claim 2, wherein each switching power module further includes a current transformer integrated within the transformer and is coaxial with the primary winding, each current transformer of a previous switching power module is connected to the PWM controller of a subsequent switching power module through the synchronous signal generator connected between the two switching power circuits, and each synchronous pulse generator measures the induction electric potential of the previous switching power module connected thereto through the current transformer of the previous switching power module.

4. The extensible switching power circuit as claimed in claim 2, wherein each synchronous pulse generator comprises one end connected to the switch of the previous switching power module connected thereto and another end connected to the PMW controller of the subsequent switching power module connected thereto, and the PWM controller of the subsequent switching power module measures the controlling electric potential of the switch of the previous switching power module through the synchronous signal generator.

5. The extensible switching power circuit as claimed in claim 2, wherein each synchronous pulse generator comprises one end connected to the PWM controller of the previous switching power module connected thereto and another end connected to the PMW controller of the subsequent switching power module connected thereto, and the PWM controller of the subsequent switching power module measures the controlling electric potential of the switch of the previous switching power module through the synchronous signal generator and the PWM controller of the previous switching power module.

6. The extensible switching power circuit as claimed in claim 2, wherein the controlling electric potentials are square wave voltages, and the synchronous pulse signals are generated according to the controlling electric potentials.

7. The extensible switching power circuit as claimed in claim 1, wherein each switching power module further includes two switches and each transformer is a central-tapped transformer including a primary winding and a secondary winding, with two ends of the primary winding respectively grounded through the two switches, the central tap of the primary winding connected to the rectifier filter circuit, wherein the PWM controller is connected to the two switches to generate controlling electric potentials to respectively turn the two switches periodically on, such that the DC provided by the rectifier filter circuit periodically passes through the primary winding and generates an induction electric potential in the secondary winding.

8. The extensible switching power circuit as claimed in claim 7, wherein the PWM controller of each previous switching power module is connected to the PWM controller of the subsequent switching power module through a synchronous signal generator, and the PWM controller of the subsequent switching power module measures the controlling electric potential of the switches of the previous switching power module through the synchronous signal generator.

9. The extensible switching power circuit as claimed in claim 1, wherein the controlling electric potentials are square wave voltages, and the synchronous pulse signals are generated according to the controlling electric potentials.

* * * * *